(12) United States Patent
MacLachlan et al.

(10) Patent No.: US 7,070,043 B1
(45) Date of Patent: Jul. 4, 2006

(54) MODULAR PLASTIC CONVEYOR BELT SUITABLE FOR TIGHT TURNS

(75) Inventors: Gilbert J. MacLachlan, Chalmette, LA (US); R. Scott Dailey, Destrehan, LA (US); Richard M. Klein, Slidell, LA (US); Errol P. Knott, Gonzales, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/160,096

(22) Filed: Jun. 8, 2005

(51) Int. Cl.
*B65G 17/06* (2006.01)

(52) U.S. Cl. ...................................... 198/853; 198/778
(58) Field of Classification Search ................ 198/778, 198/850, 853
See application file for complete search history.

(56) References Cited

U.S. PATENT DOCUMENTS

| | | | | |
|---|---|---|---|---|
| 4,742,907 A | | 5/1988 | Palmaer | 198/831 |
| 4,972,942 A | * | 11/1990 | Faulkner | 198/853 |
| 5,141,099 A | * | 8/1992 | Baumgartner | 198/778 |
| 5,174,439 A | | 12/1992 | Spangler et al. | 198/853 |
| 5,346,059 A | | 9/1994 | Irwin | 198/852 |
| 5,358,096 A | | 10/1994 | Faulkner et al. | 198/778 |
| 5,372,248 A | | 12/1994 | Horton | 198/852 |
| 5,379,883 A | * | 1/1995 | Damkjaer | 198/853 |
| 5,431,275 A | | 7/1995 | Faulkner | 198/853 |
| 5,547,071 A | | 8/1996 | Palmaer et al. | 198/853 |
| 5,566,817 A | * | 10/1996 | Meeker | 198/848 |
| 5,738,205 A | | 4/1998 | Draebel | 198/852 |
| 5,906,270 A | * | 5/1999 | Faulkner | 198/853 |
| 5,921,379 A | | 7/1999 | Horton | 198/852 |
| 6,036,001 A | | 3/2000 | Stebnicki et al. | 198/852 |
| 6,041,917 A | | 3/2000 | Layne | 198/853 |
| 6,216,854 B1 | * | 4/2001 | Damkj.ae butted.r et al. | 198/853 |
| 6,223,889 B1 | * | 5/2001 | Layne et al. | 198/853 |
| 6,237,750 B1 | | 5/2001 | Damkjaer et al. | 198/778 |
| 6,811,023 B1 | * | 11/2004 | Christiana et al. | 198/822 |
| 6,837,367 B1 | | 1/2005 | Klein et al. | 198/853 |

* cited by examiner

*Primary Examiner*—Joe Dillon, Jr.
(74) *Attorney, Agent, or Firm*—James T. Cronvich

(57) ABSTRACT

A modular plastic conveyor belt having an A-shaped edge portion in belt edge modules along each belt row for tight collapse of the belt at the inside of a turn. The A-shaped region comprises two alternating series of laterally spaced links, each extending from opposite ends of the edge module. Each of the first series of links forms an acute angle measured clockwise from the direction of belt travel. Each of the second series of links forms an acute angle measured counterclockwise from the direction of belt travel. The angles decrease monotonically with distance inward of the first side of the belt edge. Laterally extending webs join the ends of consecutive converging links along an end of the module. The lateral extent of the webs increases monotonically inward from a first side edge of the belt. A cross bars extends between each pair of web-joined links. First cross bars between links joined at a first end of the module lie along a first imaginary line; second cross bars between links joined at an opposite second end of the module lie along a second imaginary line. The two imaginary lines converge inward from the first side edge of the belt to form deeper gaps toward the first side edge for tighter belt collapse at the inside of a turn.

18 Claims, 4 Drawing Sheets

MODULAR PLASTIC CONVEYOR BELT SUITABLE FOR TIGHT TURNS

BACKGROUND

The invention relates generally to power-driven conveyors and, more particularly, to modular plastic conveyor belts suitable for following curved paths.

Many conveying applications require conveyor belts to transport articles along curved paths. In low-tension spiral conveyors, for example, a conveyor belt is wrapped helically around a cylindrical drive tower in a compact arrangement for use inside a freezer or on a cooling line. Conventionally, metal conveyor belts have been used with spiral conveyors. But, as metal belts wear, black specks or worn-off bits of metal fall on the conveyed articles. In many food applications, black specks are not acceptable. In response to the black-speck problem and other food-contamination problems, modular plastic conveyor belts have begun replacing metal belts in food applications. In an ideal situation, a modular plastic belt is a drop-in replacement for a metal belt once the take-up, tensioning, and other sprockets are replaced. But, because metal belts have inherent beam strength, they are often supported from below only intermittently across their width, such as at their side edges and middle. This minimal support structure also allows for good airflow. Plastic belts with a lot of open area for air flow and for the collapsibility required to negotiate turns, however, do not normally have much beam strength. This lack of beam strength causes conventional plastic conveyor belts to sag between the spaced apart supports. Many applications also require a belt that can turn a tight radius—often a radius about equal to the width of the belt. Consequently, there is a need for a conveyor belt with increased beam strength for wide belt constructions that is capable of following conveying paths with tight turns and that does not have the shortcomings of metal belts.

SUMMARY

These needs and others are satisfied by a modular plastic conveyor belt embodying features of the invention. In one aspect, the modular plastic conveyor belt comprises a series of rows of belt modules. Each row extends laterally in width from a first side edge to a second side edge and longitudinally in the direction of belt travel from a leading end to a trailing end. An edge module in each row forms the first side edge of the row. The edge module includes an edge portion that extends generally from the first side edge of the row laterally inward toward the second side edge of the row. The edge portion includes first A-shaped leading hinge members. Each has a cross bar, a vertex, and first and second legs with laterally aligned holes formed in the legs. Second A-shaped trailing hinge members each have a cross bar, a vertex, and first and second legs with laterally aligned holes formed in them. The second A-shaped trailing hinge members are each offset laterally and extend oppositely from the first A-shaped hinge members. The vertices of the first A-shaped hinge members define the leading end of the row and the vertices of the second A-shaped hinge members define the trailing end of the row. The cross bars of the first A-shaped hinge members lie along a first imaginary line, and the cross bars of the second A-shaped hinge members lie along a second imaginary line. The first and the second imaginary lines converge inward from the first side edge of the row. Hinge pins extend through lateral passageways formed by the aligned holes through interleaved leading and trailing hinge members of consecutive rows to interconnect the rows into a conveyor belt.

In another aspect of the invention, a modular plastic conveyor belt comprises a series of rows of belt modules. Each row extends laterally in width from a first side edge to a second side edge and longitudinally in the direction of belt travel from a leading end to a trailing end. An edge module in each row forms the first side edge of the row. The edge module includes an edge portion that extends generally from the first side edge of the row laterally inward toward the second side edge of the row. The edge portion includes first laterally spaced links extending from the trailing end to the leading end of the edge module. Each first link forms an acute angle measured clockwise from the direction of belt travel. Second laterally spaced links extend from the trailing end to the leading end of the edge module. Each second link forms an acute angle measured counterclockwise from the direction of belt travel. The first links and the second links alternate in position laterally across the edge portion and form laterally aligned holes along the leading and trailing ends. First lateral webs each join the leading end of a first link to the closer leading end of a consecutive second link. Second lateral webs each join the trailing end of a first link to the closer trailing end of a consecutive second link. First cross bars each extend between a pair of first and second links joined at the leading end; second cross bars each extend between a pair of first and second links joined at the trailing end. The first cross bars define a first imaginary line, and the second cross bars define a second imaginary line. The first and the second imaginary lines converge inward from the first side edge of the row. Hinge pins extend through lateral passageways formed by the laterally aligned holes through interleaved leading and trailing joined links of consecutive rows to interconnect the rows into a conveyor belt.

BRIEF DESCRIPTION OF THE DRAWINGS

These and other features, aspects, and advantages of the invention are better understood by reference to the following description, appended claims, and accompanying drawings, in which:

DETAILED DESCRIPTION

Figure 1:
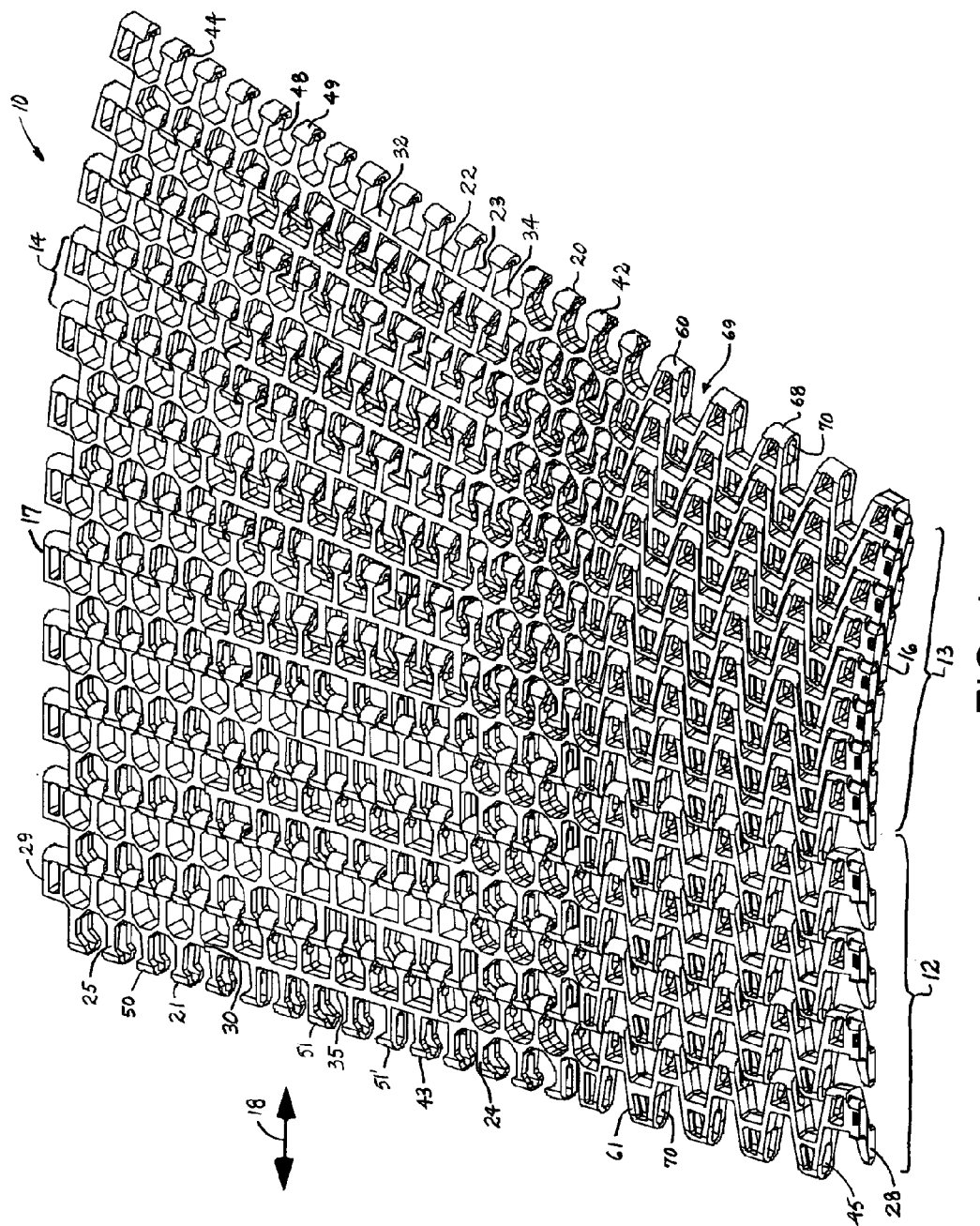
FIG. 1 is a pictorial of a portion of a modular plastic conveyor belt embodying features of the invention on both straight and curving conveyor paths.
Figure 2:
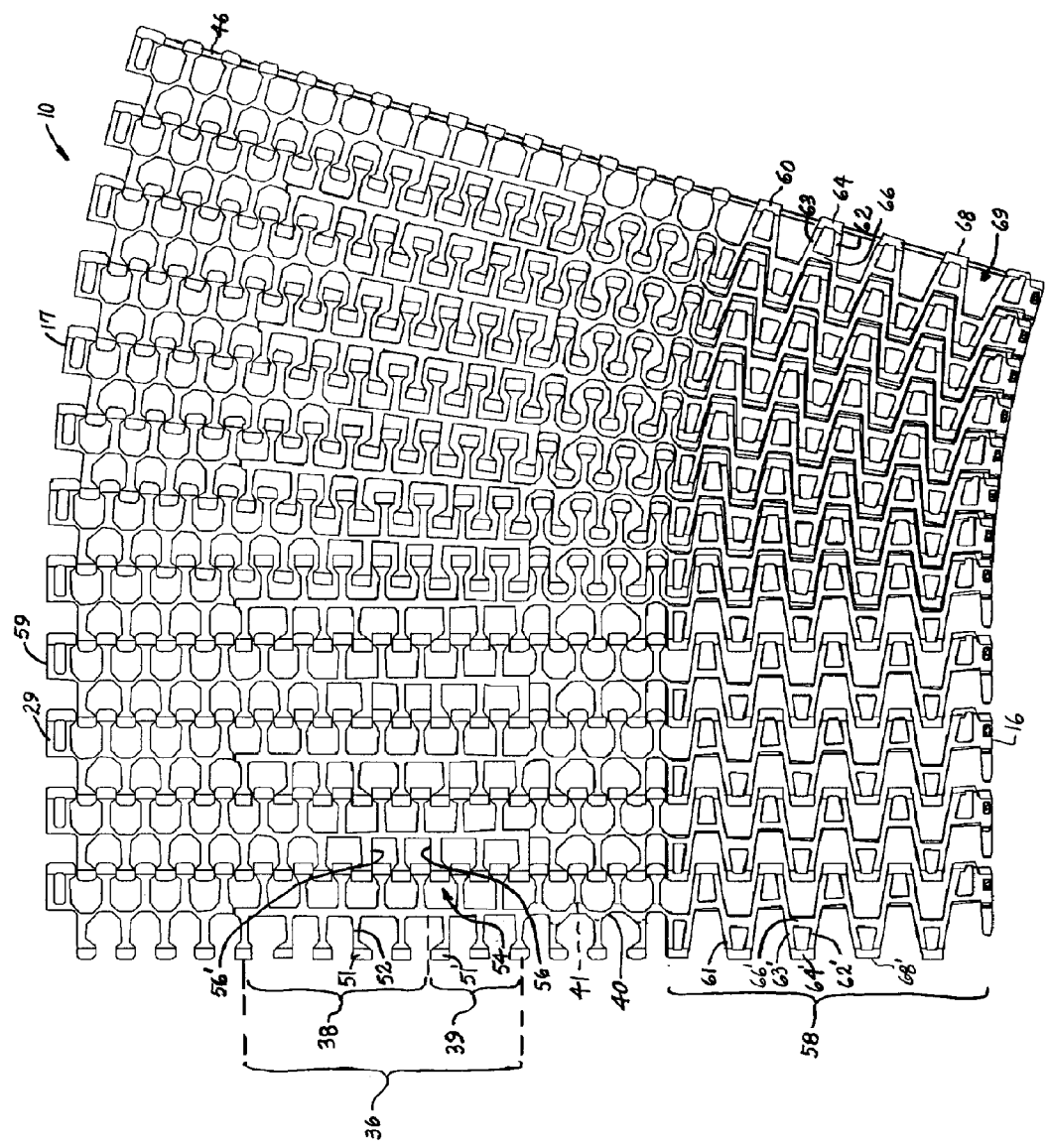
FIG. 2 is a plan view of the conveyor belt of FIG. 1.

A portion of a modular plastic conveyor belt embodying features of the invention is shown in FIGS. 1 and 2. The conveyor belt 10 is shown in FIG. 1 following a conveying path that includes straight 12 and curved 12 segments. The belt consists of a series of rows 14 of belt modules. Each row extends laterally in width from a first side edge 16 to a second side edge 17 and in the direction of belt travel 18, which may be bi-directional, from a leading end 20 to a trailing end 21. The modules extend in depth from a top side 22, on which articles are conveyed, to a bottom side 23. (The descriptors "leading" and "trailing" and "top" and "bottom" are not meant to limit the belt to a certain direction of travel or a certain orientation, but merely to help describe the general spatial relationship of various components of the example versions described.) Each row is made up of a number of belt modules arranged side by side. In this example, a row includes a first side edge module 24 and a second side edge module 25. Although not shown, it would also be possible to have internal modules without side edge structure positioned between the two side edge modules to form a wider belt. Although each row shown in FIG. 1 includes a plurality of side-by-side modules, it is possible to form each row out of a single module that has side edge structure 28, 29 at both edges. Consecutive side edge modules are cut to different widths to construct the belt in a bricklay pattern that avoids continuous seams 30 in consecutive rows. The belt modules are preferably injection molded out of a thermoplastic material, such as polyethylene, polypropylene, acetal, or a composite resin.

A central beam 32, disposed generally midway between the leading and trailing ends in the interior of each row, extends laterally across the width of an interior portion of each belt row and in depth from the top side to the bottom side. The beam has a leading vertical wall 34 and a trailing vertical wall 35. The thickness of the beam is measured between the two walls. In a middle region of the belt, the beam is characterized by a linear portion 36 in which the walls are generally straight. The thickness of the beam in its linear portion is measured in the longitudinal direction. The linear portion preferably includes a constant thickness portion 38 and a linearly tapering portion 39 in which the thickness decreases with the distance from the middle of the belt rows. In the relatively narrow belt shown in FIGS. 1 and 2, the linearly tapering portion extends from only one side of the constant thickness portion in each row. The side from which the linearly tapering portion extends alternates from row to row. In a wider belt, the linearly tapering portion preferably extends from both sides of the constant thickness portion toward both side edges of the belt. Of course, it would be possible to construct narrow or wide belts with linearly tapering portions extending from one or both sides of a constant thickness portion or even without a constant thickness region in the middle of the belt. In all these variations, the thick portion of the beam significantly adds to the beam strength of the belt.

Between the middle region and the second side edge 17 of the belt and between the middle region and a side edge portion 58 of the first side of the belt, the central beam assumes a sinuous shape. In this sinuous region, the thickness is measured generally longitudinally, but, more specifically, in a direction normal to the leading and trailing walls. The sinuous portions 40 of the central beam also generally attenuate in thickness monotonically toward the side edges of each row.

Extending longitudinally from the leading and trailing walls of the central beam are leading 42 and trailing 43 sets of hinge eyes. Although the demarcation between the hinge eyes and the central beam is not clearly defined, especially in the sinuous portions, the outline of the central beam can be approximated by interpolation as indicated by dashed curved lines 41. Each set of hinge eyes has laterally aligned holes 44, 45. In this example, the holes 44, 45 through the leading and trailing hinge eyes are elongated in the direction of belt travel to allow the belt to collapse at the inside of a turn. The trailing holes 45 are elongated farther than the leading holes 44 in this example. All the hinge eyes in the leading set are identical, with a leg 48 that extends from the leading wall of the beam to a laterally wider distal end 49. But the trailing set of hinge eyes includes, in addition to hinge eyes 50 similar to those on the leading side, selected hinge eyes 51, 51' characterized by a thicker leg 52 laterally offset relative to the distal end 49. These selected hinge eyes are preferably in a middle region of the belt. The offset directions of the legs 52 relative to the distal ends alternate back and forth throughout the middle region of the belt. As shown in FIG. 2, the thicker leg, one of whose sides is flush with a side of the distal end of the hinge eye, fills in a gap 54 between consecutive hinge eyes and provides a wall 56 that combines with a wall 56' of the next consecutive thick-legged hinge eye to serve as indexing means for preventing one row from moving laterally relative to an adjacent row. The gaps filled in by the offset legs leave less room for the distal ends 49 of the interleaved hinge eyes of the adjacent row to move laterally. In this way, the indexing means reduces lateral play between belt rows, which lessens product orientation problems on an operating belt.

The second edge module 25 at the second side edge 17 of the belt differs from the first edge module 24 at the first side edge 16 of the belt. The side edge structure 29 of the second edge module has a flat outer surface 59 that extends generally from the top side to the bottom side of the module and from the leading end to the central beam. The sinuous portion of the central beam extends to the side edge structure. In the edge portion 58 at the first side edge of the belt, the structure changes from that in the interior of the belt. The edge portion 58, which extends laterally inward from the first side edge 16 of the row, include a first plurality 60 of A-shaped hinge members along the leading end 20 of the row and a second plurality 61 of A-shaped hinge members along the trailing end 21. Each first A-shaped hinge member has a pair of angled legs 62, 63, a vertex 64, and a cross bar 66. Each second A-shaped hinge member has a pair of angled legs 62', 63', a vertex 64', and a cross bar 66'. The vertex is preferably truncated to present a broader face 68, 68' at the leading and trailing ends of the belt row. The leading hinge members 60 are laterally offset from the trailing hinge members 61 with a first leg 62' of a trailing hinge member forming a continuation of the second leg 63 of a leading hinge member. The cross bars stiffen the edge portion of the belt. Laterally consecutive cross bars are offset longitudinally closer to the vertex of the A-shaped hinge member it crosses to form a gap 69 between laterally consecutive hinge members along each end of the row to receive a hinge member of an adjacent row when the belt collapses at the inside of a turn. The gaps are deeper closer to the side edges of the row. Holes 70 elongated in the direction of belt travel are formed in the hinge members between the vertices and their associated cross bars. The holes in the hinge members 60, 61 along each end of the row are aligned with the holes in the hinge eyes 42, 43. A hinge rod 46 is received in the lateral passageway formed by the aligned holes of the leading hinge eyes and hinge members of a row interleaved with the trailing hinge eyes and hinge members of the adjacent leading row. Hinge rods connect consecutive rows together at hinge joints. The elongated holes in the hinge eyes allow the inside edge of the belt to collapse in a turn. The deeper gaps 69 between consecutive hinge members at the first side edge of the belt and the elongated holes allow the belt at the inside of a turn to collapse enough to turn a tight radius at the first side edge of the belt about equal to the width of the belt. The different side edge structure at the second side edge of the belt allows the belt to collapse in an opposite turn at the second side edge, but not on so tight a radius as the first side edge. In many applications, such as in spiral conveyors, a belt must make tight turns along one side edge only, and a stronger, but less collapsible side edge module, like the second edge module 25, may be used along the side opposite the tight turns. For bilateral tight turns, edge modules similar to the first edge module 24 would be used at both side edges of the belt.

Figure 3:
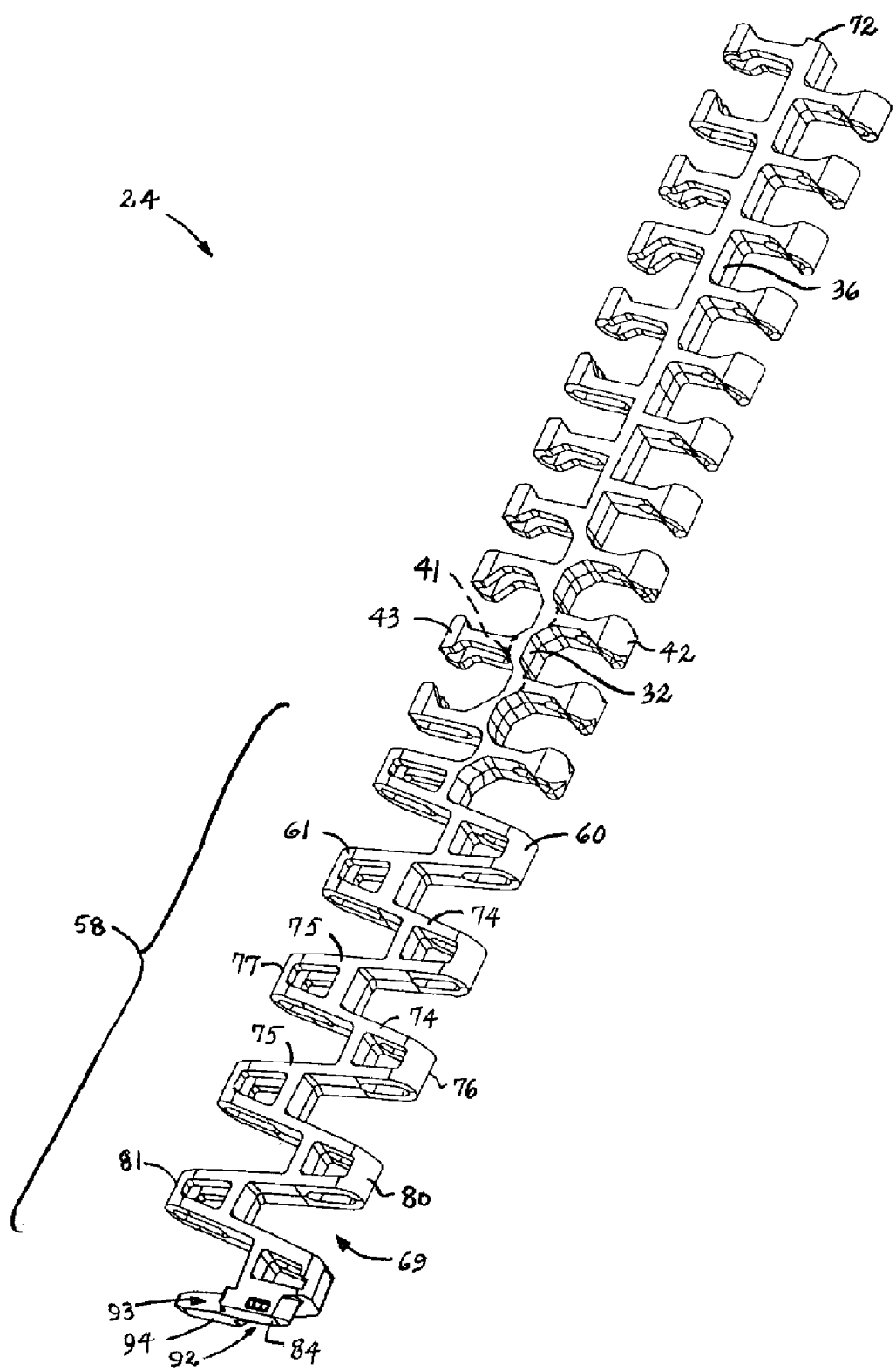
FIG. 3 is a pictorial of an edge module of the conveyor belt of FIG. 1.
Figures 4, 5:
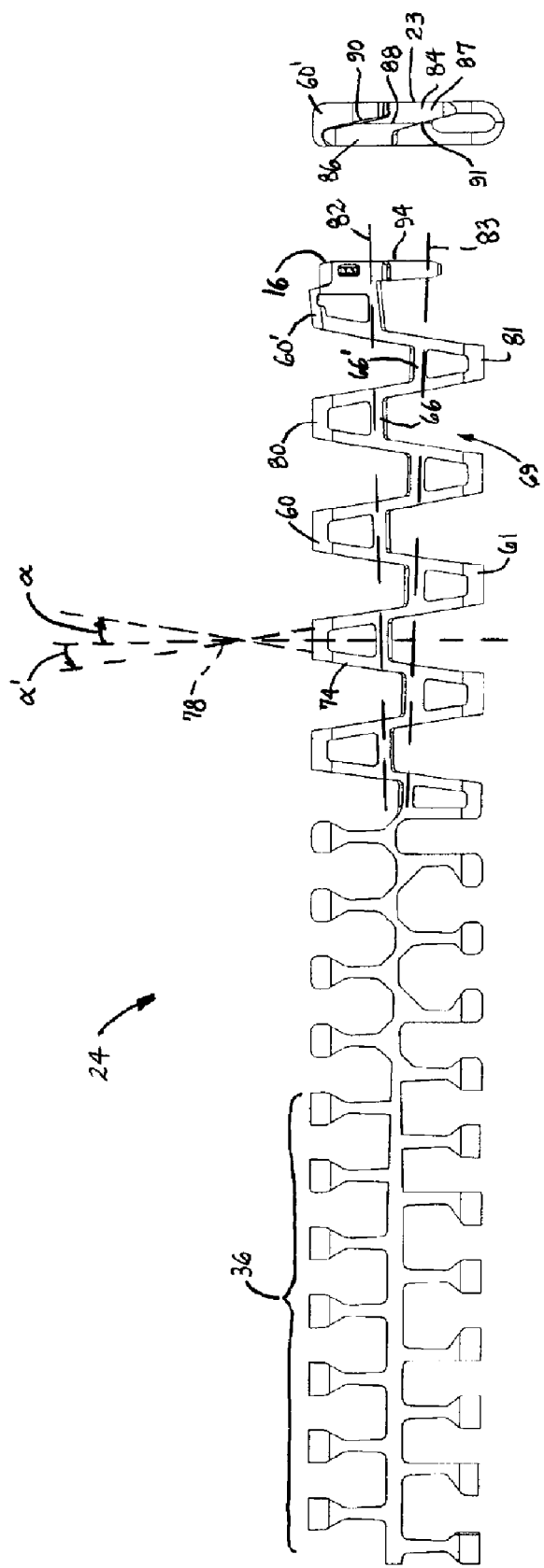
FIG. 4 is a plan view of the edge module of FIG. 3.
FIG. 5 is a side elevation view of the edge module of FIG. 3.

Details of the first side edge module 24 of the conveyor belt are shown in FIGS. 3–5. The module has the A-shaped hinge members 60, 61 at the first side edge. Toward the opposite side edge 72 of the module, the hinge members morph into hinge eyes 42, 43 that extend longitudinally outward of the sinuous portion 40 of the central beam 32. The beam assumes a thicker, linear shape in the linear portion 36 of the module that extends from the sinuous portion to the opposite side edge. The A-shaped hinge members in the edge portion 58 of the module are made of two alternating series of laterally spaced links 74, 75, each extending from a first end 76 to an opposite second end 77 of the module. Each of the first series of links forms an acute angle α measured clockwise from the longitudinal direction 78. Each of the second series of links forms an acute angle α' measured counterclockwise from the longitudinal direction. The angles decrease monotonically with distance inward of the first side edge 16 of the edge portion, for example, from 10° at the first side edge of the module to 8° near the sinuous portion of the module. Laterally extending webs 80, 81 join the ends of consecutive converging links along an end of the module. The lateral extent of the webs preferably increases monotonically inward from the first side edge of the module, for example, from 0.45 inches at the first side edge to 0.6 inches near the sinuous portion of the module. Thus, the webs nearer the edge are at least as narrow as those nearer the sinuous portion of the module. The cross bars 66, 66' each extend between a pair of links joined by webs. The first cross bars 66 between links joined at the first end of the module lie along a first imaginary line 82; the second cross bars 66' lie along a second imaginary line 83. The lines shown are linear, but they could be curvilinear or stepped lines. The two imaginary lines converge inward from the first side edge of the module to form deeper gaps 69 toward the first side edge for tighter belt collapse at the inside of a turn. Each individual cross bar is preferably angled slightly off the lateral direction, but could be aligned parallel to the lateral direction intersecting the associated imaginary line.

The first side edge of the module is formed by a zigzag edge member 84 with a first arm 86 extending along an outermost hinge member 60' from a central junction 88 of the zigzag member toward the first end 76 of the module and a second arm 87 in the form of a projection extending longitudinally toward the second end 77 of the module. The first arm is in a position occluding the hinge rod passageway along the first end of the belt to hinder the migration of a hinge rod out of the passageway. A lower surface of the projection is preferably coplanar with the bottom side 23 of the module. The two arms are vertically offset. The first arm has a lower sloped surface 90 defining a lower notch 92 narrowing toward its termination at the central junction. The second projecting arm has an upper sloped surface 91 defining an upper notch 93 narrowing toward its termination at the central junction. The second arm of a leading belt row nestles in the lower notch of the trailing belt row at the inside of a turn, while the first arm of a trailing row nestles in the upper notch of a leading row. Outside surfaces of the two arms define a flush edge 94 along the first side edge of the module. When, as in FIG. 1, a belt constructed of these edge modules collapses at the inside of a turn, the zigzag edge members of consecutive belt rows mesh to form a generally flush belt edge.

Although the invention has been described in detail with reference to some preferred versions, other versions are possible. For example, the structure of the interior portions of the belt, including the linear and sinuous portions, was specifically described. But the specific structure of the interior of the belt could be different and still be used with the belt edge structure described. Likewise, the belt edge module was shown with three portions: an A-shaped edge portion, a sinuous portion, and a linear portion. But the edge module could be made with the A-shaped edge portion alone or with some other structure that would form interior belt regions. So, as these few examples suggest, the scope of the claims are not meant to be limited to the preferred versions described in detail.

What is claimed is:

1. A modular plastic conveyor belt comprising:
   a series of rows of belt modules, each row extending laterally in width from a first side edge to a second side edge and longitudinally in the direction of belt travel from a leading end to a trailing end;
   an edge module in each row forming the first side edge of the row, wherein the edge module includes:
   an edge portion extending generally from the first side edge of the row laterally inward toward the second side edge of the row and including:
   a first plurality of A-shaped leading hinge members each having a cross bar, a vertex, and first and second legs with laterally aligned holes formed in the legs;
   a second plurality of A-shaped trailing hinge members each having a cross bar, a vertex, and first and second legs with laterally aligned holes formed in the legs;
   wherein the second plurality of A-shaped trailing hinge members is offset laterally and extends oppositely from the first plurality of A-shaped hinge members;
   wherein the vertices of the first plurality of A-shaped hinge members define the leading end of the row and the vertices of the second plurality of A-shaped hinge members define the trailing end of the row;
   wherein the cross bars of the first plurality of A-shaped hinge members lie along a first imaginary line and the cross bars of the second plurality of A-shaped hinge members lie along a second imaginary line;
   wherein the first and the second imaginary lines converge inward from the first side edge of the row;
   a plurality of hinge pins extending through lateral passageways formed by the aligned holes through interleaved leading and trailing hinge members of consecutive rows to interconnect the rows into a conveyor belt.

2. A modular plastic conveyor belt as in claim 1 wherein the vertices of the A-shaped hinge members are truncated.

3. A modular plastic conveyor belt as in claim 2 wherein the lateral dimensions of the truncated vertices increase monotonically inward of the first side edge of the row.

4. A modular plastic conveyor belt as in claim 1 wherein the first leg of a trailing hinge member forms a continuation of the first leg of a leading hinge member and wherein the second leg of the trailing hinge member forms a continuation of the second leg of a consecutive leading hinge member.

5. A modular plastic conveyor belt as in claim 1 wherein the first and second legs form acute angles with the direction of belt travel and wherein the acute angles decrease monotonically inward of the first side edge of the row.

6. A modular plastic conveyor belt as in claim 1 wherein the holes through the first and second pluralities of A-shaped hinge members are elongated in the direction of belt travel.

7. A modular plastic conveyor belt as in claim 1 wherein the edge module further includes at the first side edge of the row an edge member having a first arm that occludes the lateral passageway opening toward the first side edge of the row.

8. A modular plastic conveyor belt as in claim 1 wherein the edge module further includes at the first side edge of the row an edge member having first and second offset arms extending oppositely in the direction of belt travel from a central junction between the leading and trailing ends of the row.

9. A modular plastic conveyor belt as in claim 1 wherein the edge module further includes at the first side edge of the row a zigzag edge member that meshes with the zigzag edge members of leading and trailing rows to form a generally flush belt edge when the first side edge of the modular plastic conveyor belt collapses at the inside of a turn.

10. An edge module for a modular plastic conveyor belt, the edge module comprising:
   an edge portion extending generally from a first side edge of the module laterally inward toward an opposite second side edge of the module;
   a first plurality of A-shaped hinge members each having a cross bar, a vertex, and first and second legs with laterally aligned holes formed in the legs;
   a second plurality of A-shaped hinge members each having a cross bar, a vertex, and first and second legs with laterally aligned holes formed in the legs;
   wherein the second plurality of A-shaped hinge members is offset laterally and extends oppositely from the first plurality of A-shaped hinge members;
   wherein the vertices of the first plurality of A-shaped hinge members define a first end of the row and the vertices of the second plurality of A-shaped hinge members define a second end of the module;
   wherein the cross bars of the first plurality of A-shaped hinge members lie along a first imaginary line and the cross bars of the second plurality of A-shaped hinge members lie along a second imaginary line;
   wherein the first and the second imaginary lines converge inward from the first side edge of the module.

11. An edge module as in claim 10 further comprising at the first side edge of the module an edge member having first and second vertically offset arms extending toward the first and second ends of the module from a central junction.

12. A modular plastic conveyor belt comprising:
   a series of rows of belt modules, each row extending laterally in width from a first side edge to a second side edge and longitudinally in the direction of belt travel from a leading end to a trailing end;
   an edge module in each row forming the first side edge of the row, wherein the edge module includes:
      an edge portion extending generally from the first side edge of the row laterally inward toward the second side edge of the row and including:
         first laterally spaced links extending from the trailing end to the leading end of the edge module, each link forming an acute angle measured clockwise from the direction of belt travel;
         second laterally spaced links extending from the trailing end to the leading end of the edge module, each link forming an acute angle measured counterclockwise from the direction of belt travel;
         wherein the first links and the second links alternate in position laterally across the edge portion and form laterally aligned holes along the leading and trailing ends;
         first lateral webs each joining the leading end of a first link to the closer leading end of a consecutive link;
         second lateral webs each joining the trailing end of a first link to the closer trailing end of another consecutive link;
         first cross bars each extending between a pair of first and second links joined at the leading end;
         second cross bars each extending between a pair of first and second links joined at the trailing end;
         wherein the first cross bars define a first imaginary line and the second cross bars define a second imaginary line;
         wherein the first and the second imaginary lines converge inward from the first side edge of the row;
   a plurality of hinge pins extending through lateral passageways formed by the laterally aligned holes through interleaved leading and trailing joined links of consecutive rows to interconnect the rows into a conveyor belt.

13. A modular plastic conveyor belt as in claim 12 wherein the lateral dimensions of the first and second links increase monotonically inward of the first side edge of the row.

14. A modular plastic conveyor belt as in claim 12 wherein the acute angles decrease monotonically inward of the first side edge of the row.

15. A modular plastic conveyor belt as in claim 12 wherein the holes through the first and second laterally spaced links are elongated in the direction of belt travel.

16. A modular plastic conveyor belt as in claim 12 wherein the edge module further includes at the first side edge of the row an edge member having a first arm that occludes the lateral passageway opening toward the first side edge of the row.

17. An edge module for a modular plastic conveyor belt, the edge module comprising:
   an edge portion extending in a longitudinal direction from a first end to a second end and generally from a first side edge of the edge module laterally inward toward a second side edge of the edge module and including:
      first laterally spaced links extending from a first end to an opposite second end of the edge module, each link forming an acute angle measured clockwise from the longitudinal direction;
      second laterally spaced links extending from the first end to the second end of the edge module, each link forming an acute angle measured counterclockwise from the longitudinal direction;
      wherein the first links and the second links alternate in position laterally across the edge portion and form laterally aligned holes along the first and second ends;
      first lateral webs each joining the first end of a first link to the closer first end of a consecutive link;
      second lateral webs each joining the second end of a first link to the closer second end of another consecutive link;
      first cross bars each extending between a pair of first and second links joined at the first end;

second cross bars each extending between a pair of first and second links joined at the second end;

wherein the first cross bars define a first imaginary line and the second cross bars define a second imaginary line;

wherein the first and the second imaginary lines converge inward from the first side edge of the belt module.

18. An edge module as in claim 17 further comprising at the first side edge of the module an edge member having first and second offset arms extending toward the first and second ends of the module from a central junction.

* * * * *